(12) United States Patent
Qu et al.

(10) Patent No.: US 6,792,530 B1
(45) Date of Patent: Sep. 14, 2004

(54) IMPLICIT CERTIFICATE SCHEME

(75) Inventors: Minghua Qu, Mississauga (CA); Scott A. Vanstone, Waterloo (CA)

(73) Assignee: Certicom Corp., Mississauga (CA)

( * ) Notice: Subject to any disclaimer, the term of this patent is extended or adjusted under 35 U.S.C. 154(b) by 669 days.

(21) Appl. No.: 09/667,819

(22) Filed: Sep. 22, 2000

Related U.S. Application Data

(63) Continuation of application No. PCT/CA99/00244, filed on Mar. 23, 1999.

(30) Foreign Application Priority Data

Mar. 23, 1998 (CA) .............................. 2232936
Apr. 20, 1998 (CA) .............................. 2235359

(51) Int. Cl.⁷ .............................. H04L 9/00; H04L 9/30
(52) U.S. Cl. .......................... 713/156; 380/28; 380/30; 380/279
(58) Field of Search .......................... 380/28, 30, 279; 713/156

(56) References Cited

FOREIGN PATENT DOCUMENTS

| | | | |
|---|---|---|---|
| CH | 678134 | 7/1991 | ............ H04K/1/02 |
| EP | 0807911 | 11/1997 | ............ G07F/19/00 |

OTHER PUBLICATIONS

H. Danisch, "RFC 1824", 1995, pp. 5.*
M. Girault, "Self–certified public keys", LNCS 547, Advances in Cryptology—Eurocrypt '91, Springer, pp. 490–497.*
C. Gunther, "An Identity–Based Key–Exchange Protocol", LNCS 434, Advances in Crytology—Eurocrypt '89, Springer, pp. 29–37.*
A. Shamir, Identity–Based Cryptosystems And Signature Schemes, LNCS 196, Advances in Cryptology—Crypto '84, Springer, pp. 47–53.*

Alfred J. Menezes and Scott A. Vanstone, "Elliptic Curve Cryptosystems and Their Implementation", Journal of Cryptology, International Associattion for Cryptologic Research, 1993, pp. 209–224.

Holger Petersen and Patrick Horster, "Self–certified keys—Concepts and Applications", Ecole Normale Superieure in Paris and The University of Klagenfurt in Austria, 1997, pp. 1–15.

* cited by examiner

*Primary Examiner*—Gilberto Barrón
*Assistant Examiner*—Minh Dinh
(74) *Attorney, Agent, or Firm*—John R. S. Orange; Santosh K. Chari

(57) ABSTRACT

A method of generating a public key in a secure digital communication system, having at least one trusted entity CA and subscriber entities A. For each entity A, the trusted entity selects a unique identity distinguishing the entity A. The trusted entity then generates a public key reconstruction public data of the entity A by mathematically combining public values obtained from respective private values of the trusted entity and the entity A. The unique identity and public key reconstruction public data of the entity A serve as A's implicit certificate. The trusted entity combines the implicit certificate information with a mathematical function to derive an entity information f and generates a value $k_A$ by binding f with private values of the trusted entity. The trusted entity transmits the value $k_A$ to the entity A to permit A to generate a private key from $k_A$, A's private value and A's implicit certificate. The entity A's public key information may be reconstructed from public information, and A's implicit certificate.

8 Claims, 2 Drawing Sheets

IMPLICIT CERTIFICATE SCHEME

This application is a Continuation of International Application number PCT/CA99/00244, filed Mar. 23, 1999, the content of which is incorporated herein by reference.

This invention relates to key distribution schemes for transfer and authentication of encryption keys.

BACKGROUND OF THE INVENTION

Diffie-Hellman key agreement provided the first practical solution to the key distribution problem, in cryptographic systems. The key agreement protocol allowed two parties never having met in advance or shared key material to establish a shared secret by exchanging messages over an open (unsecured) channel. The security rests on the intractability of the Diffie-Hellman problem and the related problem of computing discrete logarithms.

With the advent of the Internet and such like the requirement for large-scale distribution of public keys and public key certificates are becoming increasingly important. Public-key certificates are a vehicle by which public keys may be stored, distributed or forwarded over unsecured media without danger of undetectable manipulation. The objective is to make one parties' public key available to others such that its authenticity and validity are verifiable.

A public-key certificate is a data structure consisting of a data part and a signature part. The data part contains cleartext data including as a minimum, public key and a string identifying the party to be associated therewith. The signature part consists of the digital signature of a certification authority (CA) over the data part, thereby binding the entities identity to the specified public key. The CA is a trusted third party whose signature on the certificate vouches for the authenticity of the public key bound to the subject entity.

Identity-based systems (ID-based system) resemble ordinary public-key systems, involving a private transformation and a public transformation, but parties do not have explicit public keys as before. Instead, the public key is effectively replaced by a party's publicly available identity information (e.g. name or network address). Any publicly available information, which uniquely identifies the party and can be undeniably associated with the party, may serve as identity information.

An alternate approach to distributing public keys involves implicitly certified public keys. Here explicit user public keys exist, but they must be reconstructed rather than transported by public-key certificates as in certificate based systems. Thus implicitly certified public keys may be used as an alternative means for distributing public keys (e.g. Diffie-Hellman keys).

An example of an implicitly certified public key mechanism is known as Gunther's implicitly-certified (ID-based) public key method. In this method:

1. A trusted server T selects an appropriate fixed public prime p and generator $\alpha$ of $Z_p^*$. T selects a random integer t, with $1 \leq t \leq p-2$ and $\gcd(t, p-1)=1$, as its private key, and publishes its public key $u=\alpha^t \mod p$, along with $\alpha$, p.

2. T assigns to each party A a unique name or identifying string $I_A$ and a random integer $k_A$ with $\gcd(k_A, p-1)=1$. T then computes $P_A = \alpha^{k_A} \mod p$. $P_A$ is A's KEY reconstruction public data, allowing other parties to compute $(P_A)^a$ below.

3. Using a suitable hash function h, T solves the following equation for a:

$$H(I_A) \equiv t \cdot P_A + k_A \, a \pmod{p-1}$$

4. T securely transmits to A the pair $(r,s)=(P_A, a)$, which is T's ElGamal signature on $I_A$. (a is A's private key for Diffie-Hellman key-agreement)

5. Any other party can then reconstruct A's Diffie-Hellman public key $P_A^a$ entirely from publicly available information $(\alpha, I_A, u, P_A, p)$ by computing:

$$P_A^a \equiv \alpha^{h(I_A)} u^{-P_A} \mod p$$

Thus for discrete logarithm problems, signing a certificate needs one exponentiation operation, but reconstructing the ID-based implicitly-verifiable public key needs two exponentiations. It is known that exponentiation in the group $Z_p^*$ and its analog scalar multiplication of a point in $E(F_q)$ is computationally intensive. For example an RSA scheme is extremely slow compared to elliptic curve systems. However despite the resounding efficiency of EC systems over RSA type systems this is still a problem particularly for computing devices having limited computing power such as "smart cards", pagers and such like.

SUMMARY OF THE INVENTION

The present invention seeks to provide an efficient ID-based implicit certificate scheme, which provides improved computational speeds over existing schemes. For convenience, we describe the schemes over $Z_p$, however these schemes are equally implementable in elliptic curve cryptosystems.

In accordance with this invention there is provided a method of generating an identity-based public key in a secure digital communication system, having at least one trusted entity CA and subscriber entities A, the method comprising the steps of:

(a) for each entity A, the CA selecting a unique identity $I_A$ distinguishing the entity A;

(b) generating a public key reconstruction public data $\gamma_A$ of entity A by mathematically combining a generator of the trusted party CA with a private value of the entity A, such that the pair $(I_A, \gamma_A)$ serves as A's implicit certificate;

(c) combining the implicit certificate information $(I_A, \gamma_A)$ in accordance with a mathematical function $F(\gamma_A, I_A)$ to derive an entity information f;

(d) generating a private key a of the entity A by signing the entity information f and transmitting the private key a to the entity A, whereby the entity A's public key may be reconstructed from the public information, the generator $\gamma_A$ and the identity $I_A$ relatively efficiently.

In accordance with a further embodiment of the invention there is provided a public key certificate comprising a plurality of public keys having different bit strengths and wherein one of the public keys is an implicitly certified public key.

BRIEF DESCRIPTION OF THE DRAWINGS

Embodiments of the present invention will now be described by way of example only with reference to the accompanying drawings in which.

DETAILED DESCRIPTION OF A PREFERRED EMBODIMENT

Figure 1:
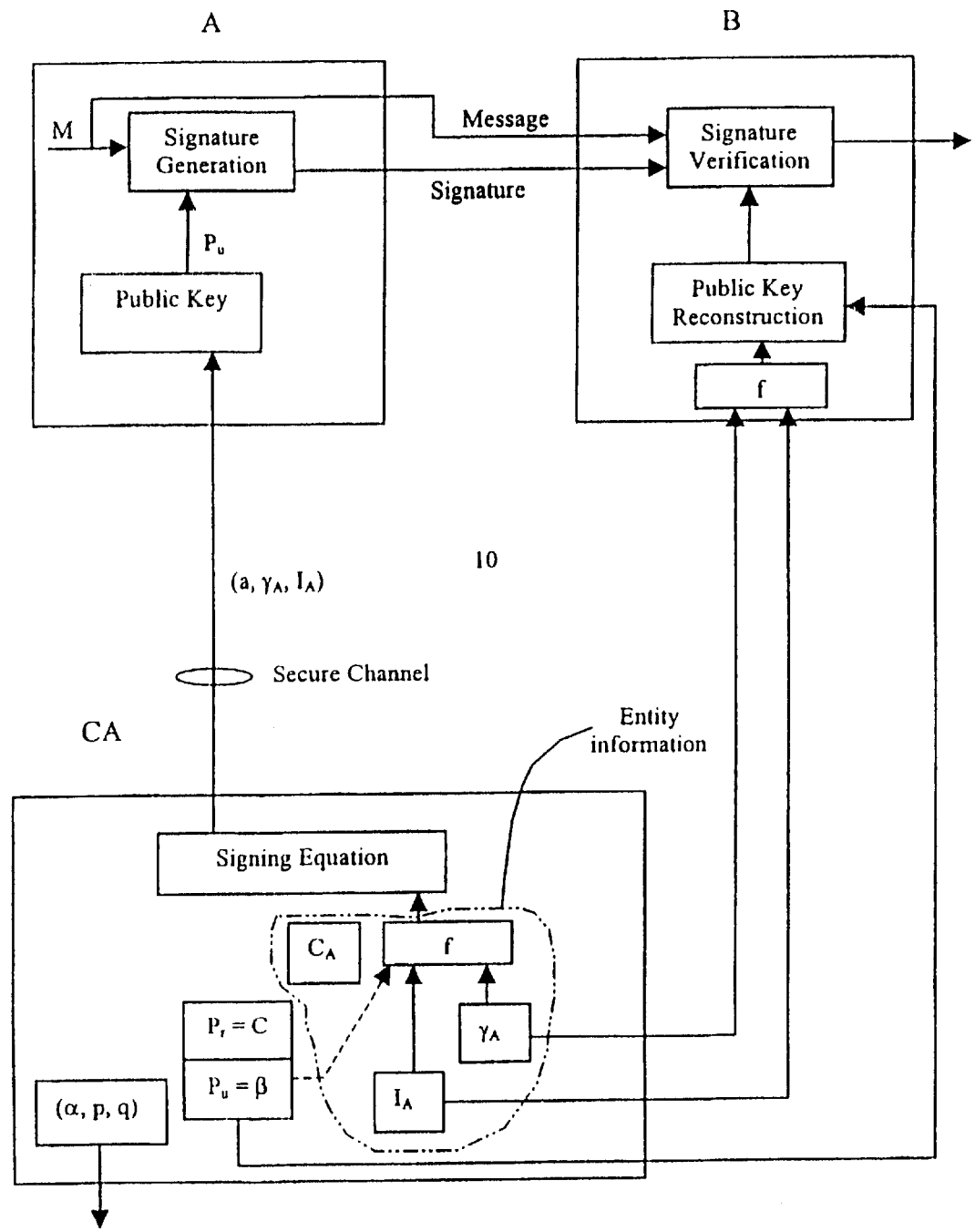
FIG. 1 is a schematic representation of a first system configuration according to an embodiment of the present invention.

Referring to FIG. 1, a system with implicitly-certified public keys is shown generally by 10. This system 10 includes a trusted third party CA and at least a pair of first and second correspondents A and B respectively. The correspondents A and B exchange information over a communication channel and each includes a cryptographic unit for performing visual finding/verification and encryption/decryption.

Referring back to FIG. 1, the trusted party CA selects an appropriate prime p with p=tq+1 where q is a large prime and a generator $\alpha$ of order q. The CA selects a random integer c, with $1 \leq c \leq q-1$ as its private key, then computes the public key $\beta = \alpha^c$ mod p and publishes ($\beta$, $\alpha$, p, q).

Scheme 1:

1. For each party A, the CA choose a unique distinguished name or identity $I_A$ (e.g., name, address, phone number), and a random integer $c_A$ with $1 \leq c_A \leq q-1$. Then the CA computes $\gamma_A = \alpha^{c_A}$ mod p. ($\gamma_A$ is the party A's public key reconstruction public data. The pair ($I_A$, $\gamma_A$) serves as A's implicit certificate)

2. The CA selects a function $f = F(I_A, \gamma_A)$. For example, $F(\gamma_A, I_A) = \gamma_A + h(I_A)$, or $F(\gamma_A, I_A) = h(\gamma_A + I_A)$ where h is a secure hash function and solves the following equation for a, which is party A's private key. If a=0, then the CA chooses another $c_A$ and re-solves the equation.

$$1 = cf + c_A a \pmod{q}$$

3. The CA securely sends the triple ($\gamma_A$, a, $I_A$) to A, which is CA's signature on $I_A$.

Then
   a is A's private key;
   $\gamma_A$ is A's generator; and
   $\gamma_A{}^a (= \alpha^{c_A a})$ is A's public key.

A publishes ($\alpha$, $I_A$, $\beta$, $\gamma_A$, p, q) in the public domain.

4. Anyone can obtain party A's (ID-based) implicitly verifiable public key from the public domain by computing, $$\gamma_A{}^a = \alpha \beta^{-f} \pmod{p},$$

thus deriving the public key from the above equation, which requires only one exponentiation operation.

Although everyone can reconstruct party A's public key from public data, this does not mean that the reconstructed public key $\gamma_A{}^a$ has been certified. This scheme is more effective when it is combined with an application protocol that shows that party A has complete knowledge of the corresponding private key. For example, with the MQV key-agreement scheme or with any signature scheme and particularly with an KCDSA (Korean Certificate based Digital Signature Algorithm). In general, this implicit certificate scheme can be used with any scheme, which is required to verify the certificate. This may be demonstrated by referring to the Digital Signature Algorithm (DSA) signature scheme.

Suppose Alice has a private key $\alpha$, generator $\gamma_A$ and publishes ($\alpha$, $I_A$, $\beta$, $\gamma_A$, p, q) in public domain. Now Alice wants to sign a message M using DSA.

Alice does the following:

1. randomly chooses k, computes $r = \gamma_A{}^k \pmod{p}$;
2. computes e=sha-1(M);
3. computes $s = k^{-1}(e+ar) \pmod{p}$;
4. The signature on M is (r,s).

Verifier does the following:

1. gets Alice's public data ($\alpha$, $I_A$, $\beta$, $\gamma_A$, p, q) and reconstructs the public key $$\delta_A = \gamma_A{}^a = \alpha \beta^{-f} \pmod{p};$$

2. computes e=sha-1(M);
3. computes $u_1 = es^{-1} \pmod{q}$ and $u_2 = rs^{-1} \pmod{q}$;
4. computes $r' = \gamma_A{}^{u_1} \delta_A{}^{u_2}$ mod p;
5. if r=r', the signature is verified. At the same time Alice's (ID-based) public key is implicitly verified.

The pair ($I_A$, $\gamma_A$) serves as certificate of Alice. Reconstructing the public key serves as implicit verification when the application protocol results in a valid verification. Recall that obtaining the public key needs only one exponentiation operation.

In an alternate embodiment, the scheme can be generalized to most ElGamal signature schemes by modifying the signing equation appropriately. In the following section, we give some examples.

Scheme 2:

The CA uses the signing equation $1 = ca + c_A f \pmod{q}$. The CA securely sends the triple ($\gamma_A$, a, $I_A$) to A, then a is A's private key, $\beta$ is A's generator and $\beta^a$ is A's public key. A publishes ($\alpha$, $I_A$, $\beta$, $\gamma_A$, p, q) in public domain. Anyone can obtain A's (ID-based) implicitly certified public key from the public domain by computing $$\beta^a = \alpha \gamma_A{}^{-f} \pmod{p}$$

For this scheme, each user has the same generator $\beta$ which is the CA's public key.

Scheme 3:

The CA uses the signing equation $a = cf + CA \pmod{q}$. The CA securely sends the triple ($\gamma_A$, a, $I_A$) to A, then a is A's private key, $\alpha$ is A's generator and $\alpha^a$ is A's public key. A publishes ($\alpha$, $I_A$, $\beta$, $\gamma_A$, p, q) in the public domain. Anyone can obtain A's (ID-based) implicitly certified public key from the public domain by computing $$\alpha^a = \beta^f \gamma_A \pmod{p}$$

For this scheme, each user including the CA has the same generator $\alpha$.

Scheme 4:

The CA uses the signing equation $a \equiv c_A f + c \pmod{q}$. The CA securely sends the triple ($\gamma_A$, a, $I_A$) to A, then a is A's private key, $\alpha$ is A's generator and $\alpha^a$ is A's public key. A publishes ($\alpha$, $I_A$, $\beta$, $\gamma_A$, p, q) in the public domain. Anyone can obtain A's (ID-based) implicitly certified public key from the public domain by computing $$\alpha^a = \gamma_A{}^{71} \beta \pmod{p}$$

For this scheme, each user including CA has same generator $\alpha$.

Figure 2:
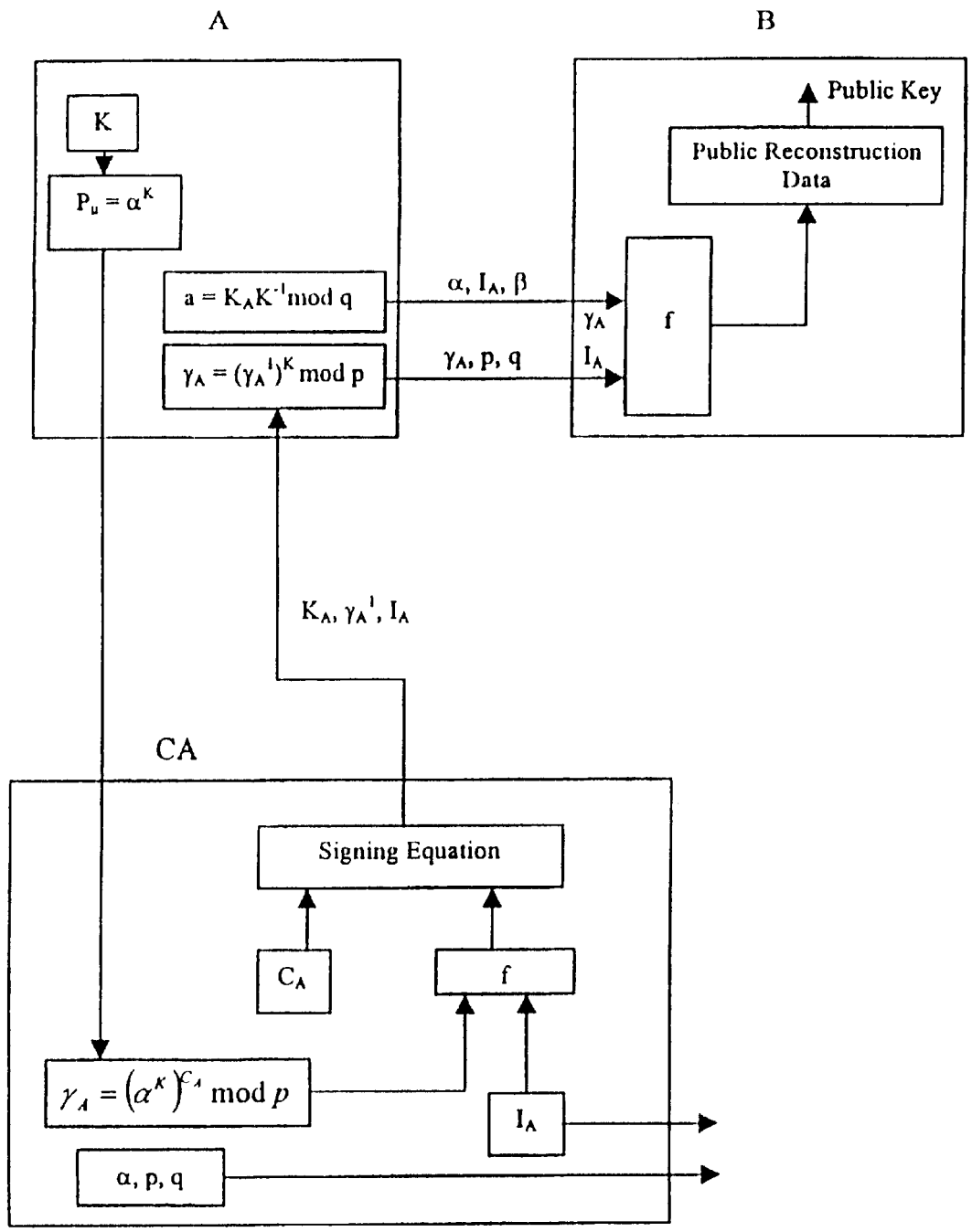
FIG. 2 is a schematic representation of a second system configuration according to an embodiment in the present invention.

In the above schemes the user or party A does not have freedom to choose its own private key. The following schemes as illustrated in FIG. 2 both the CA and the user control the user's private key but only the user knows its private key.

Scheme 5':

A first randomly chooses an integer k and computes $\alpha^k$, then sends it to the CA. The CA computes $\gamma_A = \alpha^{k c_A}$ mod p, and solves the following signing equation for $k_A$ $$1 = cf + c_A k_A \pmod{q}.$$

Then the CA computes $\gamma_A{}^1 = \alpha^{c_A}$ mod p and sends the triple $(\gamma_A{}^1, k_A, I_A)$ to A. A computes $a = k_A k^{-1} \pmod q$ and $\gamma_A = (\gamma_A{}^1)^k \pmod p$. Then a is A's private key, $\gamma_A$ is A's generator and $\gamma_A{}^a$ is A's public key. A publishes $(\alpha, I_A, \beta, \gamma_A, p, q)$ in the public domain. Anyone can obtain A's (ID-based) implicitly certified public key from the public domain by computing $$\gamma_A{}^a = \alpha \beta^{-f} \pmod p$$

Scheme 6:
1. A randomly chooses an integer k and computes $\beta^k$, then sends it to the CA.
2. The CA randomly chooses an integer $c_A$, computes $\gamma_A = \beta^k \alpha^{c_A} \pmod p$ and $f = F(\gamma_A, I_A)$, solves the signing equation for $k_A$ (if $k_A = 0$, then choose another $c_A$)

$$1 = ck_A + c_A f \pmod q.$$

Then CA computers $\gamma_A{}^1 = \beta^{c_A c^{-1}} \pmod p$ and sends the triple $(\gamma_A{}^1, k_A, I_A)$ to A.

Note: $(\gamma_A{}^1, k_A, I_A)$ can be sent by public channel.

3. A computes $\gamma_A = (\gamma_A{}^1)^{k^{-1}} \alpha^k \pmod p$, $f = F(\gamma_A, I_A)$, and $a = k_A - kf \pmod q$. (if $a = 0, 1$, then goes back to step 1.). Then checks if $\beta^a = \alpha \gamma_A{}^{-f}$. Now a is A's private key, $\beta$ is A's generator and $\beta^a$ is A's public key. A publishes $(\alpha, I_A, \beta, \gamma_A, p, q)$ in the public domain.
4. Anyone can obtain A's (ID-based) implicitly certified public key from the public domain by computing $$\beta^a = \alpha \gamma_A{}^{-f} \pmod p$$

Scheme 7:
A first randomly chooses an integer k and computes $\alpha^k$, then sends it to the CA. Now CA computes $\gamma_A = \alpha^k \alpha^{c_A} \pmod p$, solves the signing equation for $k_A$ $$k_A = cf + c_A \pmod q$$

Then the CA computes $\gamma_A{}^1 = (\alpha^k)^{c_A} \pmod p$ and sends the triple $(\gamma_A{}^1, k_A, I_A)$ to A. A computes $\gamma_A = (\gamma_A{}^1)^{k^{-1}} \alpha^k \pmod p$. Then $a = k_A + k \pmod q$ is A's private key, $\alpha$ is A's generator and $\alpha^a$ is A's public key. A publishes $(\alpha, I_A, \beta, \gamma_A, p, q)$ in public domain. Anyone can obtain A's (ID-based) implicitly certified public key from the public domain by computing $$\alpha^a = \beta^f \gamma_A \pmod p$$

Scheme 8:
1. A randomly chooses an integer k and computes $\alpha^k$, then sends it to the CA.
2. The CA randomly chooses an integer $c_A$, computes $\gamma_A = \alpha^k \alpha^{c_A} \pmod p$ and $f = F(\gamma_A, I_A)$, computes $k_A$ (if $k_A = 0$, then choose another $c_A$)

$$k_A = c_A f + c \pmod q.$$

Then CA computers $\gamma_A{}^1 = (\alpha^k)^{c_A} \pmod p$ and sends the triple $(\gamma_A{}^1, k_A, I_A)$ to A.

Note: $(\gamma_A{}^1, k_A, I_A)$ can be sent by public channel.

3. A computes $\gamma_A = (\gamma_A{}^1)^{k^{-1}} \alpha^k \pmod p$, $f = F(\gamma_A, I_A)$, and $a = k_A + kf \pmod q$. (if $a = 0, 1$, then goes back to step 1.). Then checks if $\alpha^a = \gamma_A{}^f \beta$. Now a is A's private key, $\alpha$ is A's generator and $\alpha^a$ is A's public key. A publishes $(\alpha, I_A, \beta, \gamma_A, p, q)$ in public domain.
4. Anyone can obtain A's (ID-based) implicitly certified public key from the public domain by computing $$\alpha^a = \gamma_A{}^f \beta \pmod p$$

In the above schemes 5–8, anyone can get some partial information of user A's private key $\alpha$ since $k_A$ is sent by public channel. To hide this information and to speed up computation of above schemes, we introduce DES encryption to get following scheme 9–12 by modifying scheme 5–8. The advantages in scheme 9–12 is that user can compute K easily since $\beta$ is fixed.

Scheme 9:
1. A randomly chooses an integer k and computes $\alpha_k$, then sends it to CA.
2. CA randomly chooses an integer $C_A$, computes $\gamma_A = \alpha^{kc_A} \pmod p$ and $f = F(\gamma A, \beta, I_A)$, solves the signing equation for $k_A$ (if $k_A = 0$, then choose another $C_A$).

$$1 = cf + c_A k_A \pmod q$$

Next CA computes $K = (\alpha^k)^c \pmod p$ and $\bar{k}_A = DES_K(k_A)$, then sends the triple $(\gamma_A, \bar{k}_A, I_A)$ to A.

$\gamma_A$
3. A computes $K = \beta^k \pmod p$, $k_A = DES_K(\bar{k}_A)$, and $a = k_A k^{-1} \pmod q$. (if $a = 1$, then goes back to step 1). Then checks if $\gamma_A{}^a = \alpha \beta^{-f}$. Now a is A's private key, $\gamma_A$ is A's generator and $\gamma_A{}^a$ is A's public key. A publishes $(\alpha, I_A, \beta, \gamma_A, p, q)$ in public domain.
4. Anyone can obtain A's (ID-based) implicitly certified public key from the public domain by computing $$\gamma_A{}^a = \alpha \beta^{-f} \pmod p$$

Scheme 10:
1. A randomly chooses an integer k and computes $\beta^k$, then sends it to CA.
2. CA randomly chooses an integer $C_A$, computes $\gamma_A = \beta^k \alpha^{c_A} \pmod p$ and $f = F(\gamma_A, \beta, I_A)$, solves the signing equation for $k_A$ (if $k_A = 0$, then choose another $C_A$.

$$1 = ck_A + c_A f \pmod q$$

Next CA computes $K = (\beta^k)^{c_u c^{-1}} = \alpha^{kc_A} \pmod p$ and $\bar{k}_A = DES_K(k_A)$, then sends the triple $(\gamma_A, \bar{k}_A, I_A)$ to A.

Note: $(\gamma_A, \bar{k}_A, I_A)$ can be sent by public channel.

3. A computes $K = (\gamma_A / \beta^k)^k = \alpha^{kc_A} \pmod p$, $k_A = DES_K(\bar{k}_A)$, $f = F(\gamma_A, \beta, I_A)$ and computes $a = k_A - kf \pmod q$. (if $a = 0, 1$, then goes back to step 1). Then checks if $\beta^a = \alpha \gamma_A{}^{-f}$. Now a is A's private key, $\beta$ is A's generator and $\beta^a$ is A's public key. A publishes $(\alpha, I_A, \beta, \gamma_A, p, q)$ in public domain.
4. Anyone can obtain A's (ID-based) implicitly certified public key from the public domain by computing $$\beta^a = \alpha \gamma_A{}^{-f} \pmod p$$

Scheme 11
1. A randomly chooses an integer k and computes $\alpha^k$, then sends it to CA.
2. CA randomly chooses an integer $C_A$, computes $\gamma_A = \alpha^k \alpha^{c_A} \pmod p$ and $f = F(\gamma_A, \beta, I_A)$ computes $k_A$ (if $k_A = 0$, then choose another $C_A$)

$$k_A = cf + c_A \pmod q.$$

Next CA computes $K = (\alpha^k)^c \pmod p$ and $\bar{k}_A = DES_K(k_A)$, then sends the triple $(\gamma_A, \bar{k}_A, I_A)$ to A.

Note: $(\gamma_A, \bar{k}_A, I_A)$ can be sent by public channel.

3. A computes $K = \beta^k \pmod p$, $k_A = DES_K(\bar{k}_A)$, and $a = k_A + k \pmod q$ (if $a = 0, 1$, then goes back to step 1). Then checks if $\alpha^a = \beta^f \gamma_A$. Now $\alpha$ is A's private key, $\alpha$ is A's generator and $\alpha^a$ is A's public key. A publishes $(\alpha, I_A, \beta, \gamma_A, p, q)$ in public domain.
4. Anyone can obtain A's (ID-based) implicitly certified public key from the public domain by computing $\alpha^a = \gamma_A{}^f \pmod p$ Scheme 12:
1. A randomly chooses an integer k and computes $\alpha^k$, then sends it to CA.
2. CA randomly chooses an integer $C_A$, computes $\gamma_A = \alpha^k \alpha^{c_A}$ (mod p) and $f = F(\gamma_A, \beta, I_A)$ computes $k_A$ (if $k_A = 0$, then choose another $C_A$) $k_A = c_A f + c \pmod{q}$
Next CA computes $K = (\alpha^k)^c \pmod{p}$ and $\overline{k}_A = DES_K(k_A)$, then sends the triple $(\gamma_A, \overline{k}_A, I_A)$ to A.
Note: $(\gamma_A, \overline{k}_A, I_A)$ can be sent by public channel.
3. A computes $K = \beta^k \pmod{p}$, $k_A = DES_K(\overline{k}_A), f = F(\gamma_A, \beta, I_A)$, and $a = k_A + kf \pmod{q}$. (if $a = 0, 1$, then goes back to step 1). Then checks if $\alpha^a = \gamma_A^f \beta$. Now a is A's private key, $\alpha$ is A's generator and $\alpha^a$ is A's public key. A publishes $(\alpha, I_A, \beta, \gamma_A, p, q)$. Anyone can obtain A's (ID-based) implicitly certified public key from the public domain by computing $$\alpha^a = \gamma_A^f \beta \pmod{p}$$

The advantages for schemes 9–12 are that user A can compute K easily since $\beta$ is fixed and that $k_A$ is encrypted such that no other people can know it.

Note that for schemes 5–12, adding an option parameter OP to the function $F(\gamma_A, \beta, I_A)$(i.e., $f = F(\gamma_A, \beta, I_A, OP)$ will make the schemes more useful. For example, $OP = \alpha^{a_E}$, where $a_E$ is user A's private encryption key and $\alpha^{a_E}$ is user A's public encryption key. Following scheme 15 is a modification of scheme 7. Schemes 5–12 can be modified in the same way. The schemes 1–4 can also be modified in the same way.

Scheme 13:
1. A randomly chooses an integer k and computes $\alpha^k$, then sends it to CA.
2. CA randomly chooses an integer $c_A$, computes $\gamma_A = \alpha^k \alpha^{c_A}$ (mod p) and $f = F(\gamma_A, I_A, OP)$, computes $k_A$ (if $k_A = 0$, then choose another $c_A$)

$$k_A \equiv cf + c_A \pmod{q}.$$

Next CA computers $K = H((\alpha^k)^c)$ and $\overline{k}_A = DES_K(k_A)$, then sends the triple $(f, \overline{k}_A, I_A)$ to A.
3. A computes $K = H(\beta^k)$, $k_A = DES_K(\overline{k}_A)$, and $a = k_A + k \pmod{q}$ (if $a = 0, 1$, then goes back to step 1.) Then computes $\gamma_A = \alpha^a \beta^{-f} \pmod{p}$ and checks if $f = F(\gamma_A, I_A, OP)$. Now a is A's private key, $\alpha$ is A's generator and $\alpha^a$ is A's public key. A publishes $(\alpha, I_A, \beta, \gamma_A, p, q)$ in public domain.
4. Anyone can obtain A's (ID-based) implicitly certified public key from the public domain by computing $$\alpha^a = \beta^f \gamma_A \pmod{p}$$

Furthermore we can reduce the bandwidth by following scheme 14.
Scheme 14:
1. A randomly chooses an integer k and computes $\alpha^k$, then sends it to CA.
2. CA randomly chooses an integer $c_A$, computes $\gamma_A = \alpha^k \alpha^{c_A}$ (mod p) and set $\hat{\gamma}_A$ as the first 80 least significant bits of $\gamma_A$. Then computes $f = F(\hat{\gamma}_A, I_A, OP)$ and $k_A$(if $k_A = 0$, then choose another $c_A$)

$$k_A \equiv cf + c_A \pmod{q}.$$

Next CA computers $K = (\alpha^k)^c \pmod{p}$ and $\overline{k}_A = DES_K(k_A)$, then sends the triple $(\hat{\gamma}_A, \overline{k}_A, I_A)$ to A.
Note: $(\hat{\gamma}_A, \overline{k}_A, I_A)$ can be sent by public channel.
3. A computes $K = \beta^k \pmod{p}$, $k_A = DES_K(\overline{k}_A)$, and $a = k_A + k \pmod{q}$ (if $a = 0, 1$, then goes back to step 1.) Then computes $f = F(\hat{\gamma}_A, \beta, I_A)$, $\gamma_A = \alpha^a \beta^{-f} \pmod{p}$ and checks if the first 80 least significant bits of $\gamma_A$ is $\hat{\gamma}_A$. Now a is A's private key, $\alpha$ is A's generator and $\alpha^a$ is A's public key. A publishes $(\alpha, I_A, \beta, \gamma_A, p, q)$ in public domain.
4. Anyone can obtain A's (ID-based) implicitly certified public key from the public domain by computing $$\alpha^a = \beta^f \gamma_A \pmod{p}$$

The security level of scheme 5.c is not as other schemes we discuss before. Scheme 5.c only has 80 bit security. But it is OK for practical application Now. We can extend the first 80 least significant bits to the half least significant bits of $\gamma_A$. The implicit certificate can be used to certify some other useful information by including the information in the option parameter OP. For example $OP = \alpha^{a_E} \| OP_2$, where $a_E$ is user A's another private key and $\alpha^{a_E}$ is the corresponding public key. Following scheme 15 is a modification of scheme 7. Other schemes can be modified in the same way.
Scheme 15:
1. A randomly chooses an integer $a_E$ and computes $\alpha^{a_E}$.
2. A randomly chooses an integer k and computes $\alpha^k$, then sends $\alpha^k$ and $\alpha^{a_E}$ to CA.
3. CA randomly chooses an integer $c_A$, computes $\gamma_A = \alpha^k \alpha^{c_A}$ (mod p) and $f = F(\gamma_A, \beta, I_A, \alpha^{a_E})$. (for example,
$f = F(\gamma_A, \beta, I_A, \alpha^{a_E}) = h(\gamma_A \| \beta \| I_A \| \alpha^{a_E}))$ computes $k_A$(if $k_A = 0$, then choose another $C_A$)

$$k_A \equiv cf + c_A \pmod{q}$$

Then CA computes $\gamma_A^1 = (\alpha^k)^{c_A} \pmod{p}$ and sends the triple $(\gamma_A^1, k_A, I_A)$ to A.
Note: $(\gamma_A^1, k_A, I_A)$ can be sent by public channel.
4. A computes $a = k_A + k \pmod{q}$. (if $a = 0, 1$, then goes back to step 1) and computes $\gamma_A = \gamma_A^{1^{k^{-1}}} \alpha^k \pmod{p}$. Then checks if $\alpha^a = \beta^f \gamma_A$. Now a is A's private signing key, $\alpha$ is A's generator and $\alpha^a$ is A's public signing key, $a_E$ is A's private encryption key and $\alpha^{a_E}$ is A's public encryption key. A publishes $((\alpha, \alpha^{a_E}, I_A, \beta, \gamma_A, p, q)$ in public domain.
5. Anyone can obtain A's (ID-based) implicitly certified public key from the public domain by computing $$\alpha^a = \beta^f \gamma_A \pmod{p}$$

Notes: (for scheme 13–15)
1. The identity $I_A$ may be chosen either by CA or by entity A
2. CA should authenticate the entity A. It can be done by the method described in the note 2 of scheme 11.
3. $(f, \overline{k}_A, I_A)$ or $(\hat{\gamma}_A, \overline{k}_A, I_A)$ or $(\gamma_A^1, k_A, I_A)$ can be sent by public channel.

In our schemes, $(\alpha, \gamma_A)$ is CA's signature on A's ID $I_A$, it was supposed to be known by public. But now, only user A knows the a. So when we use these schemes, we should make sure that in application protocol, user A knows his/her own private key. In other words, the application protocol must guarantee that A uses his/her private key in the computation.

The security of the new scheme depends on the signing equations. For example, in scheme 1, the signing equation is $$1 = cf + c_A a \pmod{q}. \tag{1}$$

We are going to show that for some choice of the one way function $F(\gamma_A, I_A)$, the new scheme 1 is equivalent to DSA.

Let's consider CA using DSA signing equation to sign A's identity $I_A$. First CA randomly choose a $c_A$ and compute $\gamma_A = \alpha^{c_A} \pmod p$, then CA uses a secure hash function h to computer $h(I_A)$, finally CA solves following equation for s.

$$h(I_A) = c \gamma_A + c_A s \pmod{q}. \tag{2}$$

Now $(\gamma_A, s)$ is CA's signature on $I_A$. Multiply equation (2) by $h(I_A)^{-1}$ we got $$1 \equiv c\gamma_A h(I_A)^{-1} + c_A s h(I_A)^{-1} \pmod{q}$$

Let $F(\gamma_A, I_A) = \gamma_A h(I_A)^{-1}$ and replace $sh(I_A)^{-1}$ by $a$ in above equation we got the equation (1). Obviously, equation (2) is equivalent to equation (1) if $F(\gamma_A, I_A) = \gamma_A h(I_A)^{-1}$. That means, if anyone can break the scheme using the signing equation (1), then he/she can break the scheme using the signing equation (2) which is DSA scheme.

Heuristic arguments suggest our new schemes are secure for suitable choice of $F(\gamma_A, I_A)$, where $F(\gamma_A, I_A) = \gamma_A h(I_A)$ or $F(\gamma_A, I_A) = h(\gamma_A, I_A)$. Note $F(\gamma_A, I_A)$ can be some other format, for example when $I_A$ is small, say 20 bits, but q is more than 180 bits, then we can use $F(\gamma_A, I_A) = \gamma_A + I_A$. A disadvantage of the new schemes is all users and CA use the same field size. However this is the way that all ID-based implicitly certified public key schemes work, for example, Girault's RSA based Diffie-Hellman public key agreement scheme.

A further set of schemes may also be described as follows:

System setup: A trusted party CA selects an appropriate prime p with $p=tq+1$ where q is a large prime and a generator $\alpha$ of order q. CA selects a random integer c, with $1<c<q$ as its private key, computes the public key $\beta = \alpha^c \bmod p$ and publishes $(\beta, \alpha, p, q)$. Then CA chooses a special cryptographic function $f = F(\gamma_A, I_A, OP)$ ($f: \{0,1\}^* \to \{1,2,\ldots(q-1)\}$) such that with this function, the signature scheme which used to produce implicit certificate is secure, where OP represents some option parameters that user may concern (such as date, or $\beta$ the CA's public key). For example, let h be a secure hash function, f can be one of following format 1. $F(\gamma_A, I_A, OP) = \gamma_A + \beta + h(I_A)$
2. $F(\gamma_A, I_A, OP) = h(\gamma_A \| \beta \| I_A)$
3. $F(\gamma_A, I_A, OP) = \gamma_A + \beta + I_A$ where $I_A$ has some pattern (or when $I_A$ is small, say 20 bits, and q is more than 180 bits)
4. $F(\gamma_A, I_A, OP) = \gamma_A + h(I_A)$
5. $F(\gamma_A, I_A, OP) = h(\gamma_A \| I_A)$
6. $F(\gamma_A, I_A, OP) = \gamma_A + I_A$ where $I_A$ has some pattern (or when $I_A$ is small, say 20 bits, and q is more than 180 bits)
7. It is very easy to change the parameters a little bit to get a secure signature scheme from a given secure signature scheme. So $F(\gamma_A, I_A, OP)$ can be any other format that guarantee the signature scheme which used to produce implicit certificate is secure. Note that by suitable choosing $F(\gamma_A, I_A, OP)$, Any Elgamal-like signature scheme we know so far is equivalent to one of the 4 families schemes we proposed in this paper if it is used as implicit certificate scheme after modification. But our proposed schemes have the most efficiency.

Note: the above system setup will be assumed in the following schemes.

Scheme 1.a:
1. For each entity A, CA chooses a unique distinguished name or identity $I_A$ (e.g., name, address, phone number), and a random integer $c_A$ with $1<c_A<q$. Then CA computes $\gamma_A = \alpha^{c_A} \bmod p$. ($\gamma_A$ is A's public key reconstruction public data. $(I_A, \gamma_A)$ serves as A's implicit certificate)
2. CA computes $f = F(\gamma_A, I_A, OP)$ and solves the following equation for a (if $a=0,1,c, c_A^{-1}c$, then chooses another $c_A$ and re-solve the equation).

$$1 \equiv cf + c_A a \pmod{q}.$$

3. CA securely sends the triple $(\gamma_A, a, I_A)$ to A, which is CA's signature on $I_A$. Then a is A's private key, $\gamma_A$ is A's generator and $\gamma_A^a (= \alpha^{c_A a})$ is A's public key. A publishes $(\alpha, I_A, \beta, \gamma_A, p, q)$ in public domain.
4. Anyone can obtain A's (ID-based) implicitly verified public key from the public domain by computing $$\gamma_A^a = \alpha \beta^{-f} \pmod{p}$$

Note:
1. In step 1, The identity $I_A$ may be chosen by entity A.
2. In step 2, we exclude $a=0,1$, since in this case any one can easily knowing A's private key. Especially when $a=0$, $c_A^{-1}c$, any one can compute CA's private key c from $1 \equiv cf \pmod{q}$.
3. For this scheme, each user has different system generator $\gamma_A$.

Scheme 1.b:
1. For each entity A, CA chooses a unique distinguished name or identity $I_A$ (e.g., name, address, phone number), and a random integer $c_A$ with $1<c_A<q$. Then CA computes $\gamma_A = \alpha^{c_A} \bmod p$. ($\gamma_A$ is A's public key reconstruction public data. $(I_A, \gamma_A)$ serves as A's implicit certificate)
2. CA computes $f = F(\gamma_A, I_A, OP)$ and solves the following equation for a (if $a=0,1,c$, then chooses another $c_A$ and re-solve the equation)

$$1 \equiv ca + c_A f \pmod{q}.$$

3. CA securely sends the triple $(\gamma_A, a, I_A)$ to A, which is CA's signature on $I_A$. Then a is A's private key, $\beta$ is A's generator and $\beta^a$ is A's public key. A publishes $(\alpha, I_A, \beta, \gamma_A, p, q)$ in public domain.
4. Anyone can obtain A's (ID-based) implicitly verified public key from the public domain by computing $$\beta^a = \alpha \gamma_A^{-f} \pmod{p}$$

Note:
1. In step 1, The identity $I_A$ may be chosen by entity A.
2. In step 2, we exclude $a=0,1$, since in this case any one can easily knowing A's private key, when $a=0$, the certificate does not involve to CA.
3. For this scheme, each user has same system generator $\beta$.

Scheme 1.c:
1. For each entity A, CA chooses a unique distinguished name or identity $I_A$ (e.g., name, address, phone number), and a random integer $c_A$ with $1<c_A<q$. Then CA computes $\gamma_A = \alpha^{c_A} \bmod p$. ($\gamma_A$ is A's Public key reconstruction public data. $(I_A, \gamma_A)$ serves as A's implicit certificate)
2. CA computes $f = F(\gamma_A, I_A, OP)$ and solves the following equation for a (if $a=0,1$ or c, then chooses another $c_A$ and re-solve the equation).

$$a \equiv cf + c_A \pmod{q}.$$

3. CA securely sends the triple $(\gamma_A, a, I_A)$ to A, which is CA's signature on $I_A$. Then a is A's private key, $\alpha$ is A's generator and $\alpha^a$ is A's public key. A publishes $(\alpha, I_A, \beta, \gamma_A, p, q)$ in public domain.
4. Anyone can obtain A's (ID-based) implicitly verified public key from the public domain by computing $$\alpha^a = \beta^f \gamma_A \pmod{p}$$

Note:
1. In step 1, The identity $I_A$ may be chosen by entity A.
2. In step 2, we exclude $a=0,1$, since in this case any one can easily knowing A's private key.
3. For this scheme, each user has same system generator $\alpha$.

Scheme 1.d:
1. For each entity A, CA chooses a unique distinguished name or indentity $I_A$ (e.g., name, address, phone number), and a random integer $c_A$ with $1<c_A<q$. Then CA computes $\gamma_A = \alpha^{c_A} \mod p$. ($\gamma_A$ is A's public key reconstruction public data. ($I_A$, $\gamma_A$) serves as A's implicit certificate)

2. CA computes $f=F(\gamma_A, I_A, OP)$ and solves the following equation for a (if a=0,1 or c, then chooses another $c_A$ and re-solve the equation).

$$a \equiv c_A f + c \pmod{q}.$$

3. CA securely sends the triple ($\gamma_A$, a, $I_A$) to A, which is CA's signature on $I_A$. Then a is A's private key, $\alpha$ is A's generator and $\alpha^a$ is A's public key. A publishes ($\alpha$, $I_A$, $\gamma_A$, p, q) in public domain.

4. Anyone can obtain A's (ID-based) implicitly verified public key from the public domain by computing $$\alpha^a = \gamma_A^f \beta \pmod{p}$$

Note:
1. In step 1, The identity $I_A$ may be chosen by entity A.
2. In step 2, we exclude a=0,1, since in this case any one can easily knowing A's private key.
3. For this scheme, each user has same system generator $\alpha$. Although everyone can reconstruct user A's public key from public data, this does not mean that the reconstructed public key has been certified. To explicitly verify the certificate, we need to know the a. Once we know the a, the verification process become to verify CA's signature on $I_A$. For example, In scheme 1.a, if verifier computes $\alpha\beta^{-f}$ and user A computes $\gamma_A^a$ using a, then they can verify the certificate together. But verifier must make sure that user A indeed knows a. So reconstructing public key serves as an implicit verification only if it combines with an application protocol that shows user A has a complete knowledge of the corresponding private key. In general, the implicit certificate scheme can be used with any public key scheme which needs to authenticate the subject entity and the public key. Let's demonstrate it by using DSA signature scheme as implicit certified public key system and scheme 1.a as implicit certificate scheme.

Suppose Alice has private key a, generator $\gamma_A$ and publishes ($\alpha$, $I_A$, $\beta$, $\gamma_A$, p, q) in public domain. Now Alice wants to sign a message M using DSA.

Alice does following:
1. randomly chooses k, computes $r = \gamma_A^x \pmod p$.
2. computes e=sha-1(M).
3. computes $s = x^{-1}(e+ar) \pmod q$
4. The signature on M is (r,s).

Verifier does following
1. gets Alice's public data ($\alpha$, $I_A$, $\beta$, $\gamma_A$, p, q) and computes $f$ and reconstructs the public key $$\beta_A = \gamma_A^a = \alpha\beta^{-f} \pmod p$$

2. computes e=sha-1(M).
3. computes $u_1 = es^{-1} \pmod q$ and $u_2 = rs^{-1} \pmod q$
4. computes $r^1 = \gamma_A^{u_1} \delta_A^{u_1} \pmod p$
5. if $r=r^1$, the signature is verified. At same time Alice's (ID-bases) public key is implicitly verified.

The pair ($I_A$, $\gamma_A$) serves as certificate of Alice. For DSA, we know that it is very hard to forge Alice's signature without knowing a. Then reconstructing tile public key serves as implicitly verification when the application protocol ends up with valid. Recall that obtaining the public key needs only one exponentiation operation. For this reason, we say that verifying the implicit certificate needs one exponentiation operation.

The following implicit certificate schemes may be derived by modifying the schemes above such that CA and entity both control the entity's private key but only tile subject entity knows his/her private key.

In this section we need another system parameter H(*), where H(*) is an cryptographic function which may be a secure hash function or one way function or identity map.

Scheme 2.a:
1. A randomly chooses an integer k and computes $\alpha^k$, then sends it to CA.
2. CA randomly chooses an integer $c_A$, computes $\gamma_A = \alpha^{kc_A}$ (mod p) and $f=F(\gamma_A, I_A, OP)$, solves the signing equation for $k_A$ (if $k_A=0$ or c, then chooses another $c_A$)

$$1 \equiv cf + c_A k_A \pmod{q}.$$

Then CA computers $\gamma_A^1 = \alpha^{c_A} \pmod p$ and sends the triple ($\gamma_A^1$, $k_A$, $I_A$) to A.

3. A computes $a = k_A k^{-1} \pmod q$. (if a=1, then goes back to step 1.) and computes $\gamma_A = (\gamma_A^1)^k \pmod p$. Then checks if $\gamma_A^a = \alpha\beta^{-f}$. Now a is A's private key, $\gamma_A$ is A's generator and $\gamma_A^a$ is A's public key. A publishes ($\alpha$, $I_A$, $\beta$, $\gamma_A$, p, q) in public domain.

4. Anyone can obtain A's (ID-based) implicitly certified public key from the public domain by computing $$\gamma_A^a = \alpha\beta^{-f} \pmod p$$

Scheme 2.b:
5. A randomly chooses ail integer k and computes $\beta^k$, then sends it to CA.
6. CA randomly chooses an integer $c_A$, computes $\gamma_A = \beta^k \alpha^{c_A}$ (mod p) and $f=F(\gamma_A, I_A, OP)$, solves the signing equation for $k_A$ (if $k_A=0$, c, then chooses another $c_A$)

$$1 \equiv ck_A + c_A f \pmod{q}.$$

Then CA computers $\gamma_A^1 = (\beta^k)^{c_A^{-1}} \pmod p$ and sends the triple ($\gamma_A^1$, $k_A$, $I_A$) to A.

7. A computes $\gamma_A = (\gamma_A^1)^{k^{-1}} \beta^k \pmod p$, $f=F(\gamma_A, I_A, OP)$, and $a = k_A - kf \pmod q$. (if a=0,1, then goes back to step 1.). Then checks if $\beta^a = \alpha\gamma_A^{-f}$. Now a is A's private key, $\beta$ is A's generator and $\beta^a$ is A's public key. A publishes ($\alpha$, $I_A$, $\beta$, $\gamma_A$, p, q) in public domain.

8. Anyone can obtain A's (ID-based) implicitly certified public key from the public domain by computing $$\beta^a = \alpha\gamma_A^{-f} \pmod p$$

Scheme 2.c:
1. A randomly chooses an integer k and computes $\alpha^k$, then sends it to CA.
2. CA randomly chooses an integer $c_A$, computes $\gamma_A = \alpha^k \alpha^{c_A}$ (mod p) and $f=F(\gamma_A, I_A, OP)$, computes $k_A$ (if $k_A=c$, then chooses another $c_A$)

$$k_A \equiv cf + c_A \pmod{q}.$$

Then CA computers $\gamma_A^1 = (\alpha^k)^{c_A} \pmod p$ and sends the triple ($\gamma_A^1$, $k_A$, $I_A$) to A.

3. A computes $a = k_A + k \pmod q$. (if a=0,1, then goes back to step 1.) and computes $\gamma_A = (\gamma_A^1)^{k^{-1}} \alpha^k \pmod p$. Then checks if $\alpha^a = \beta^f \gamma_A$. Now a is A's private key, $\alpha$ is A's generator and $\alpha^a$ is A's public key. A publishes ($\alpha$, $I_A$, $\beta$, $\gamma_A$, p, q) in public domain.

4. Anyone can obtain A's (ID-based) implicitly certified public key from the public domain by computing $$\alpha^a = \beta^f \gamma_A \pmod{p}$$

Scheme 2.d:
1. A randomly chooses an integer k and computes $\alpha^k$, then sends it to CA.
2. CA randomly chooses an integer $c_A$, computes $\gamma_A = \alpha^k \alpha^{c_A}$ (mod p) and $f = F(\gamma_A, I_A, OP)$, computes $k_A$ (if $k_A = c_A$, then chooses another $c_A$)

$$k_A = c_A f + c \pmod{q}.$$

Then CA computers $\gamma_A^1 = (\alpha^k)^{c_A} \pmod{p}$ and sends the triple $(\gamma_A^1, k_A, I_A)$ to A.
3. A computes $\gamma_A = (\gamma_A^1)^{k^{-1}} \alpha^k \pmod{p}$, $f = F(\gamma_A, I_A, OP)$, and $a = k_A + kf \pmod{q}$. (if $a = 0,1$, then goes back to step 1.). Then checks if $\alpha^a = \gamma_A^f \beta$. Now a is A's private key, $\alpha$ is A's generator and $\alpha^a$ is A's public key. A publishes ($\alpha, I_A, \beta, \gamma_A, p, q$) in public domain.
4. Anyone can obtain A's (ID-based) implicitly certified public key from the public domain by computing $$\alpha^a = \gamma_A^f \beta \pmod{p}$$

Notes: (for scheme 2.a, 2.b, 2.c, 2.d)
1. The identity $I_A$ may be chosen either by CA or by entity A
2. CA should authenticate the entity A. It can be done either by presence in front of CA or by secure channel or by voice (for example, on the phone) or by following method:
In step 2, instead of sending the triple $(\gamma_A^1, k_A, I_A)$ to A, CA first sends $\gamma_A^1$ to A. A computes $\gamma_A$, set $K = H(\gamma_A)$, encrypts the authentication information $A_{A1}$ of A (such as VISA information) by DES (or other symmetric key system) and sends $DES_K(A_{A1})$ to CA. CA decrypts the $DES_K(A_{A1})$ to get $A_{A1}$. After checks the validity of $A_{A1}$, CA then sends $(k_A, I_A)$ to A.
3. $(\gamma_A^1, k_A, I_A)$ can be sent by public channel.
In above scheme 2.a–2.d, The implicit certificate schemes are finished by the subject entity and the CA. Each scheme is essentially divided into two part: key-exchange part and signature part. One function of the key exchange part is to transmit implicit certificate information from CA to A by public channel (more discuss will be given in section 6). To speed up computation of above schemes, we can modify the key exchange part. Following scheme 3.a–3.d by modifying scheme 2.a–2.d. The advantages in scheme 3.a–3.d is that user A can compute K before he get respond from the CA since $\beta$ is fixed. This property is good especially for the online case.

Scheme 3.a:
1. A randomly chooses an integer k and computes $\alpha^k$, then sends it to CA.
2. CA randomly chooses an integer $c_A$, computes $\gamma_A = \alpha^{kc_A}$ (mod p) and $f = F(\gamma_A, I_A, OP)$, solves the signing equation for $k_A$ (if $k_A = 0$, then choose another $c_A$)

$$1 = cf + c_A k_A \pmod{q}.$$

Next CA computers $K = H((\alpha^k)^c)$ and $\overline{k}_A = DES_K(k_A)$, then sends the triple $(\gamma_A, \overline{k}_A, I_A)$ to A.
3. A computes $K = H(\beta^k)$, $k_A = DES_K(\overline{k}_A)$, and $a = k_A k^{-1} \pmod{q}$. (if $a = 1$, then goes back to step 1.). Then checks if $\gamma_A^a = \alpha\beta^{-f}$. Now a is A's private key, $\gamma_A$ is A's generator and $\gamma_A^a$ is A's public key. A publishes ($\alpha, I_A, \beta, \gamma_A, p, q$) in public domain.
4. Anyone can obtain A's (ID-based) implicitly certified public key from the public domain by computing $$\gamma_A^a = \alpha\beta^{-f} \pmod{p}$$

Scheme 3.b):
1. A randomly chooses an integer k and computes $\beta^k$, then sends it to CA.
2. CA randomly chooses an integer $c_A$, computes $\gamma_A = \beta^k \alpha^{c_A}$ (mod p) and $f = F(\gamma_A, I_A, OP)$, solves the signing equation for $k_A$ (if $k_A = 0$, then choose another $c_A$)

$$1 = ck_A + c_A f \pmod{q}.$$

Next CA computers $K = H((\beta^k)^{c_A c^{-1}}) = H(\alpha^{kc_A})$ and $\overline{k}_A = DES_K(k_A)$, then sends the triple $(\gamma_A, \overline{k}_A, I_A)$ to A.
3. A computes $K = H((\gamma_A/\beta^k)^k) = H(\alpha^{kc_A})$, $k_A = DES_K(\overline{k}_A)$, $f = F(\gamma_A, I_A, OP)$ and computes $a = k_A - kf \pmod{q}$. (if $a = 0,1$, then goes back to step 1.). Then checks if $\beta^a = \alpha\gamma_A^{-f}$. Now a is A's private key, $\beta$ is A's generator and $\beta^a$ is A's public key. A publishes ($\alpha, I_A, \beta, \gamma_A, p, q$) in public domain.
4. Anyone can obtain A's (ID-based) implicitly certified public key from the public domain by computing $$\beta^a = \alpha\gamma_A^{-f} \pmod{p}$$

Note: (for scheme 3.b)
1. The identity $I_A$ may be chosen either by CA or by entity A
2. CA should authenticate the entity A. It can be done either by presence in front of CA or by secure channel or by voice (for example, on the phone) or by following method:
In step 2, instead of sending the triple $(\gamma_A, \overline{k}_A, I_A)$ to A, CA first sends $\gamma_A$ to A. A computes $K = H((\gamma_A/\beta^k)^k) = H(\alpha^{kc_A})$, encrypts the authentication information $A_{A1}$ of A (such as VISA information) by DES (or other symmetric key system) and sends $DES_K(A_{A1})$ to CA. CA decrypts the $DES_K(A_{A1})$ to get $A_{A1}$. After checks the validity of $A_{A1}$, CA then sends $(\overline{k}_A, I_A)$ to A.
3. $(\gamma_A, \overline{k}_A, I_A)$ can be sent by public channel.

Scheme 3.c:
1. A randomly chooses an integer k and computes $\alpha^k$, then sends it to CA.
2. CA randomly chooses an integer $c_A$, computes $\gamma_A = \alpha^k \alpha^{c_A}$ (mod p) and $f = F(\gamma_A, I_A, OP)$, computes $k_A$ (if $k_A = 0$, then choose another $c_A$)

$$k_A = cf + c_A \pmod{q}.$$

Next CA computers $K = H((\alpha^k)^c)$ and $\overline{k}_A = DES_K(k_A)$, then sends the triple $(\gamma_A, \overline{k}_A, I_A)$ to A.
3. A computes $K = H(\beta^k)$, $k_A = DES_K(\overline{k}_A)$, and $a = k_A + k \pmod{q}$ (if $a = 0,1$, then goes back to step 1.) Then checks if $\alpha^a = \beta^f \gamma_A$. Now a is A's private key, $\alpha$ is A's generator and $\alpha^a$ is A's public key. A publishes ($\alpha, I_A, \beta, \gamma_A, p, q$) in public domain.
4. Anyone can obtain A's (ID-based) implicitly certified public key from the public domain by computing $$\alpha^a = \beta^f \gamma_A \pmod{p}$$

Scheme 3.d:
1. A randomly chooses an integer k and computes $\alpha^k$, then sends it to CA.
2. CA randomly chooses an integer $c_A$, computes $\gamma_A = \alpha^k \alpha^{c_A}$ (mod p) and $f = F(\gamma_A, I_A, OP)$, computes $k_A$ (if $k_A = 0$, then choose another $c_A$)

$$k_A = c_A f + c \pmod{q}.$$

Next CA computers $K=H((\alpha^k)^c)$ and $\overline{k}_A=DES_K(k_A)$, then sends the triple $(\gamma_A, \overline{k}_A, I_A)$ to A.

3. A computes $K=H(\beta^k)$, $k_A=DES_K(\overline{k}_A)$, $f=F(\gamma_A, I_A, OP)$, and $a=k_A+kf \pmod q$. (if $a=0,1$, then goes back to step 1.). Then checks if $\alpha^a=\gamma_A{}^f\beta$. Now a is A's private key, $\alpha$ is A's generator and $\alpha^a$ is A's public key. A publishes $(\alpha, I_A, \beta, \gamma_A, p, q)$ in public domain.

4. Anyone can obtain A's (ID-based) implicitly certified public key from the public domain by computing $$\alpha^a=\gamma_A{}^f\beta \pmod p$$

Notes: (for scheme 3.a, 3.c, 2.d)
1. The identity $I_A$ may be chosen either by CA or by entity A
2. CA should authenticate the entity A. It can be done either by presence in front of CA or by secure channel or by voice (for example, on the phone) or by following method:
   In step 1, A compute $\alpha^k$ and $K=H(\beta^k)$, then sends $\alpha^k$ and $DES_K(A_{A1})$ to CA. CA computes $K=H((\alpha^k)^c)$ and decrypts the $DES_K(A_{A1})$ to get $A_{A1}$. After check the validity of $A_{A1}$, CA continues step 2.
3. $(\gamma_A, k_A, I_A)$ can be sent by public channel.

The advantages for scheme 3.a, 3.c and 3.d are that user A can compute K easily since $\beta$ is fixed and that $k_A$ is encrypted such that no other people can know it. In fact the publicity of $k_A$ does not decrease the security of the certificate scheme. The purpose of encrypting $k_A$ is to make sure that the entity knows k. So for scheme 3.a–3.d, the DES encryption part can be removed and $\overline{k}_A$ can be replaced by $k_A$ provided the certificate scheme uses the method described in Note 2.

To save transmission bandwidth in above schemes, we can modify above schemes by sending $f=F(\gamma_A, I_A, OP)$ in stead of $\gamma_A$ (Note that in general, the size of $\gamma_A$ is large than 160 bits and $f$ is just 160 bits.) Following scheme 4.c is a modification of scheme 3.c.

Scheme 4.c:
1. A randomly chooses an integer k and computes $\alpha^k$, then sends it to CA.
2. CA randomly chooses an integer $c_A$, computes $\gamma_A=\alpha^k\alpha^{c_A}$ (mod p) and $f=F(\gamma_A, I_A, OP)$, computes $k_A$(if $k_A=0$, then choose another $c_A$)

$$k_A=cf+c_A \pmod q.$$

Next CA computers $K=H((\alpha^k)^c)$ and $\overline{k}_A=DES_K(k_A)$, then sends the triple $(f, \overline{k}_A, I_A)$ to A.

3. A computes $K=H(\beta^k)$, $k_A=DES_K(\overline{k}_A)$, and $a=k_A+k \pmod q$ (if $a=0,1$, then goes back to step 1.) Then computes $\gamma_A=\alpha^a\beta^{-f} \pmod p$ and checks if $f=F(\gamma_A, I_A, OP)$. Now a is A's private key, a is A's generator and $\alpha^a$ is A's public key. A publishes $(\alpha, I_A, \beta, \gamma_A, p, q)$ in public domain.

4. Anyone can obtain A's (ID-based) implicitly certified public key from the public domain by computing $$\alpha^a=\beta^f\gamma_A \pmod p$$

Furthermore we can reduce the bandwidth by following scheme 5.c.

Scheme 5.c:
1. A randomly chooses an integer k and computes $\alpha^k$, then sends it to CA.
2. CA randomly chooses an integer $c_A$, computes $\gamma_A=\alpha^k\alpha^{c_A}$ (mod p) and set $\hat{\gamma}_A$ as the first 80 least significant bits of $\gamma_A$. Then computes $f=F(\hat{\gamma}_A, I_A, OP)$ and $k_A$ (if $k_A=0$, then choose another $c_A$)

$$k_A=cf+c_A \pmod q.$$

Next CA computers $K=(\alpha^k)^c \pmod p$ and $\overline{k}_A=DES_K(k_A)$, then sends the triple $(\hat{\gamma}_A, \overline{k}_A, I_A)$ to A.

Note: $(\hat{\gamma}_A, \overline{k}_A, I_A)$ can be sent by public channel.

3. A computes $K=\beta^k \pmod p$, $k_A=DES_K(\overline{k}_A)$, and $a=k_A+k \pmod q$ (if $a=0,1$, then goes back to step 1.) Then computes $f=F(\hat{\gamma}_A, \beta, I_A)$, $\gamma_A=\alpha^a\beta^{-f} \pmod p$ and checks if the first 80 least significant bits of $\gamma_A$ is $\hat{\gamma}_A$. Now a is A's private key, $\alpha$ is A's generator and $\alpha^a$ is A's public key. A publishes $(\alpha, I_A, \beta, \gamma_A, p, q)$ in public domain.

4. Anyone can obtain A's (ID-based) implicitly certified public key from the public domain by computing $$\alpha^a=\beta^f\gamma_A \pmod p$$

The security level of scheme 5.c is not as other schemes we discuss before. Scheme 5.c only has 80 bit security. But it is OK for practical application Now. We can extend the first 80 least significant bits to the half least significant bits of $\gamma_A$. The implicit certificate can be used to certify some other useful information by including the information in the option parameter OP. For example $OP=\alpha^{a_E}\|OP_2$, where $a_E$ is user A's another private key and $\alpha^{a_E}$ is the corressponding public key. Following scheme 6.c is a modification of scheme 2.c. Other schemes can be modified in the same way.

Scheme 6.c:
1. A randomly chooses an integer $a_E$ and computes $\alpha^{a_E}$.
2. A randomly chooses an integer k and computes $\alpha^k$, then sends $\alpha^k$ and $\alpha^{a_E}$ to CA.
3. CA randomly chooses an integer $c_A$, computes $\gamma_A=\alpha^k\alpha^{c_A}$ (mod p) and $f=F(\gamma_A, I_A, \alpha^{a_E}, OP_2)$ (for example, $F(\gamma_A, I_A, \alpha^{a_E}, OP_2)=h(\gamma_A\|I_A\|\alpha^{a_E}))$, computes $k_A$ (if $k_A=0$, then choose another $c_A$)

$$k_A=cf+c_A \pmod q.$$

Then CA computers $\gamma_A^1=(\alpha^k)^{c_A} \pmod p$ and sends the triple $(\gamma_A^1, k_A, I_A)$ to A.

4. A computes $a=k_A+k \pmod q$. (if $a=0,1$, then goes back to step 1.) and computes $\gamma_A=(\gamma_A^1)^{k^{-1}}\alpha^k \pmod p$. Then checks if $\alpha^a=\beta^f\gamma_A$. Now a is A's private signing key, $\alpha$ is A's generator and $\alpha^a$ is A's public signing key. $a_E$ is A's private encryption key and $\alpha^{a_E}$ is A's public encryption key. A publishes $(\alpha, \alpha^{a_E}, I_A, \beta, \gamma_A, p, q)$ in public domain.

5. Anyone can obtain A's (ID-based) implicitly certified public key from the public domain by computing $$\alpha^a=\beta^f\gamma_A \pmod p$$

Notes: (for scheme 4.c, 5.c, 6.c)
1. The identity $I_A$ may be chosen either by CA or by entity A
2. CA should authenticate the entity A. It can be done by the method described in the note 2 of scheme 3.c.

$(f, \overline{k}_A, I_A)$ or $(\gamma_A^1, k_A, I_A)$ or $(\gamma_A^1, k_A, I_A)$ can be sent by public channel.

CA Chaining Scheme

In order to implement a CA chaining structure. That is CA1 authenticates CA2, CA2 authenticates CA3 and CA3 authenticates user A. In this section, we are going to present the example with 3 CA's in the CA chain. We use basic scheme 3' to demonstrate this example.

System Setup:
The highest trusted party CA1 selects an appropriate prime p with $p=tq+1$ where q is a large prime and a generator $\alpha$ of order q. CA1 selects a random integer $c_1$, with $1 \leq c_1 \leq q-1$ as its private key, then computes the public key $\beta_1=\alpha^{c_1} \mod p$ and publishes $(\beta_1, \alpha, p, q)$.

Phase 1. CA2 applies for Implicit Certified Public Key from CA1.
1. CA2 randomly chooses an integer $k_2$ and computes $\alpha^{k_1}$, then sends it to CA1.
2. CA1 choose a unique distinguished name or identity $I_{CA2}$ and a random integer $c_{CA2}$ with $1 \leq c_{CA2} \leq q-1$. Then CA1 computes $\gamma_{CA2} = \alpha^{k_2}\alpha^{c_{CA2}} \pmod{p}$. ($\gamma_{CA2}$ is CA2's public key reconstruction public data.)
3. CA1 chooses a function $f_1 = F(\gamma_{CA2}, I_{CA2})$ and computes $k_{CA2}$ (if $k_{CA2} = 0$, then chooses another $c_{CA2}$ in step 2 and re-computes for $k_{CA2}$).

$$k_{CA2} = c_1 f_1 + c_{CA2} \pmod{q}$$

4. CA1 computes $\gamma_{CA2}^{-1} = (\alpha^{k_2})^{c_{CA2}} \pmod{p}$ and sends the triple $(\gamma_{CA2}^{-1}, k_{CA2}, I_{CA2})$ to CA2.
5. CA2 computes $\gamma_{CA2} = (\gamma_{CA2}^{-1})^{k_2-1} \pmod{p}$. Then $c_2 = k_{CA2} + k_2 \pmod{q}$ is CA2's private key, $\alpha$ is CA2's generator and $\beta_2 = \alpha^{c_2}$ is CA2's public key. CA2 publishes $(\alpha, I_{CA2}, \beta_1, \beta_2, \gamma_{CA2}, p, q)$ in public domain. Note: when a user trusts CA2, he/she can use $\beta_2$ directly.
6. Anyone can obtain CA2's (ID-based) implicitly verified public key from the public domain by computing $$\beta_2 = \alpha^{c_2} = \beta_1^{f_1} \gamma_{CA2} \pmod{p}$$

Phase 2. CA3 Applies for Implicit Certified Public Key from CA2.
1. CA3 randomly choose an integer $k_3$ and computes $\alpha^{k_3}$, then sends it to CA2.
2. CA2 choose a unique distinguished name or identity $I_{CA3}$ and a random integer $c_{CA3}$ with $1 \leq c_{CA3} \leq q-1$. Then CA2 computes $\gamma_{CA3} = \alpha^{k_3}\alpha^{c_{CA3}} \pmod{p}$. ($\gamma_{CA3}$ is CA3's public key reconstruction public data.)
3. CA2 chooses a function $f_2 = F(\gamma_{CA3}, I_{CA3})$ and computes $k_{CA3}$ (if $k_{CA3} = 0$, then chooses another $c_{CA3}$ in step 2 and re-computes for $k_{CA3}$).

$$k_{CA3} = c_2 f_2 + c_{CA3} \pmod{q}$$

4. CA2 computes $\gamma_{CA3}^{-1} = (\alpha^{k_3}))^{c_{CA3}} \pmod{p}$ and sends the triple $(\gamma_{CA3}^{-1}, k_{CA3}, I_{CA3})$ to CA3.
5. CA3 computes $\gamma_{CA3} = (\gamma_{CA3}^{-1})^{k_3-1}\alpha^{k_3} \pmod{p}$. Then $c_3 = k_{CA3} + k_3 \pmod{q}$ is CA3's private key, $\alpha$ is CA3's generator and $\beta_3 = \alpha^{c_3}$ is CA3's public key. CA3 publishes $(\alpha, I_{CA3}, \beta_2, \beta_3, \gamma_{CA3}, p, q)$ in public domain.
Note: when an entity trusts CA3, it can use $\beta_3$ directly.
6. Anyone can obtain CA3's (ID-based) implicitly verified public key from the public domain by computing $$\beta_3 = \alpha^{c_3} = \beta_2^{f_2} \gamma_{CA3} \pmod{p}$$

Phase 3. User A Applies for Implicit Certified Public Key from CA3.
1. A randomly choose an integer $k$ and computes $\alpha^k$, then sends it to CA3.
2. CA3 choose a unique distinguished name or identity $I_A$ and a random integer $c_A$ with $1 \leq c_A \leq q-1$. Then CA3 computes $\gamma_A = \alpha^k \alpha^{c_A} \pmod{p}$. ($\gamma_A$ is A's public key reconstruction public data.)
3. CA3 choose a careful chosen function $f_3 = F(\gamma_A, I_A)$ and computes $k_A$ (if $k_A = 0$, then choose another $c_A$ in step 2 and re-computes for $k_A$).

$$k_A = c_3 f_3 + c_A \pmod{q}$$

4. CA3 computes $\gamma_A^{-1} = (\alpha^k)^{c_A} \pmod{p}$ and sends the triple $(\gamma_A^{-1}, k_A, I_A)$ to A.
5. A computes $\gamma_A = (\gamma_A^{-1})^{k-1}\alpha^k \pmod{p}$. Then $a = k_A + k \pmod{q}$ is A's private key, $\alpha$ is A's generator and $\beta_A = \alpha^a$ is A's public key. A publishes $(\alpha, I_A, \beta_3, \beta_A, \gamma_A, p, q)$ in public domain.

Note: when a user trusts A, he/she can use $\beta_A$ directly.
6. Anyone can obtain A's (ID-based) implicitly verified public key from the public domain by computing $$\beta_A = \alpha^a = \beta_3^{f_3} \gamma_A \pmod{p}$$

Phase 4. User A's Signature and Verification.
To sign a message M, user A does following:
1. randomly choose x, computes $r = \alpha^x \pmod{p}$.
2. computes $e = f_A = F(r, M)$, where F is some fixed function.
3. computes $s = ae + x \pmod{q}$
4. The signature on M is (r, s).
Verifier does following:
1. gets CA1, CA2, CA3 aid User A's public data $$(\alpha, I_{CA2}, I_{CA3}, I_A, \beta_1, \beta_2, \beta_3, \beta_A, \gamma_{CA2}, \gamma_{CA3}, \gamma_A, p, q)$$

2. reconstructs user A's public key $$\beta_A = \beta^{f_2 f_3}\gamma_{CA}^{f_2 f_3}\gamma_{CA}^{3}\gamma_A \pmod{p}$$

3. computes $e = f_A = F(r, M)$.
4. computes $r' = \alpha^s \beta_A^{-e} \pmod{p}$
5. if $r = r'$, the signature is verified. At same time CA2, CA3 and user A's (ID-bases) public key are implicitly verified. Reconstructing user A's public key needs only 3 known basis exponentiation operations and 3 multiplication operations. When the signature is valid, CA2, CA3 and user A's (ID-bases) public key are implicitly verified.
Notes:
1. If verifier trusts A, Then A's public key is $\beta_A$.
2. If verifier trusts CA3, Then A's reconstruction public key is $\beta_A = \beta_3^{f_3}\gamma_A \pmod{p}$
3. If verifier trusts CA2, Then A's reconstruction public key is $\beta_A = \beta_2^{f_2 f_3}\gamma_{CA3}^{f_3}\gamma_A \pmod{p}$
Co-signing Scheme.
The following describes a scheme that allows multiple CA's to sign ONE implicit certificate. This is illustrated by the case where three CA's co-sign a certificate using the basic scheme 3'.
System Setup:
Let CA1, CA2 and CA3 have a common system parameters: (1) prime p with $p = tq+1$ where q is a large prime; (2) a generator $\alpha$ of order q; (3) a careful chosen function $$f = F(\gamma, (I_{A1} + I_{A2} + I_{A3})).$$

CA1 selects a random integer $c_1$, with $1 \leq c_1 \leq q-1$ as its private key, then computes the public key $\beta_1 = \alpha^{c_1} \mod p$ and publishes $(\beta_1, \alpha, p, q)$. CA2 selects a random integer $c_2$, with $1 \leq c_2 \leq q-1$ as its private key, then computes the public key $\beta_2 = \alpha^{c_2} \mod p$ and publishes $(\beta_2, \alpha, p, q)$. CA3 selects a random integer $c_3$, with $1 \leq c_3 \leq q-1$ as its private key, then computes the public key $\beta_3 = \alpha^{c_3} \mod p$ and publishes $(\beta_3, \alpha, p, q)$.
Step 1. A randomly chooses an integer k and computes $\alpha^k$, then sends it to CA1, CA2 and CA3.
Step 2. CA's exchange information and compute implicit certificates
Phase 1.
1. CA1 chooses a unique distinguished flame or identity $I_{A1}$ and a random integer $c_{A1}$ with $1 \leq c_{A1} \leq q-1$, computes $\alpha^{c_{A1}}$ and send $(\alpha^{c_{A1}}, I_{A1})$ to CA2, and CA3.
2. CA2 choose a unique distinguished name or identity $I_{A2}$ and a random integer $c_{A2}$ with $1 \leq C_{A2} \leq q-1$, computes $(\alpha^{c_{A2}}, I_{A2})$ and send $\alpha^{c_{A2}}$ to CA1 and CA3.
3. CA3 choose a unique distinguished name or identity $I_{A3}$ and a random integer $c_{A3}$ with $1 \leq c_{A3} \leq q-1$, computes $(\alpha^{c_{A3}}, I_{A3})$ and send $\alpha^{c_{A3}}$ to CA1 and CA2.

Phase 2.
1. CA1 computes $\gamma=\alpha^k\alpha^{c_{A1}}\alpha^{c_{A2}}\alpha^{c_{CA3}}$ (mod p). ($\gamma$ is A's public key reconstruction public data.), computes $f=F(\gamma,(I_{A1}+I_{A2}+I_{A3}))$ and computes $k_{A1}$(if $k_{A1}=0$, then goes back to phase 1.)

$$k_{A1}=c_1 f+c_{A1}(\text{mod } q)$$

CA1 computes $\gamma_{A1}{}^1=(\alpha^k)^{c_{A1}}$(mod p) and sends the triple $(\gamma_{A1}{}^1, k_{A1}, I_{A1})$ to A.

2. CA2 computes $\gamma=\alpha^k\alpha^{c_{A1}}\alpha^{c_{A2}}\alpha^{c_{CA3}}$ (mod p). ($\gamma$ is A's public key reconstruction public data.), computes $f=F(\gamma,(I_{A1}+I_{A2}+IA_3))$ and computes $k^{A2}$(if $k_{A2}=0$, then goes back to phase 1.)

$$k_{A2}=c_2 f+c_{A2}(\text{mod } q)$$

CA2 computes $\gamma_{A2}{}^1=(\alpha^k)^{c_{A2}}$ (mod p) and sends the triple $(\gamma_{A2}{}^1, k_{A2}, I_{A2})$ to A.

3. CA3 computes $\gamma=\alpha^k\alpha^{c_{A1}}\alpha^{c_{A2}}\alpha^{c_{CA3}}$ (mod p). ($\gamma$ is A's public key reconstruction public data.), computes $f=F(\gamma,(I_{A1}+I_{A2}+I_{A3}))$ and computes $k_{A3}$ (if $k_{A3}=0$, then goes back to phase 1.)

$$k_{A3}=c_3 f+c_{A3}(\text{mod } q)$$

CA3 computes $\gamma_{A3}{}^1=(\alpha^k)^{c_{A3}}$ (mod p) and sends the triple $(\gamma_{A3}{}^1, k_{A3}, I_{A3})$ to A.

Step 3 A computes implicitly co-certified private keys and public key reconstruction information.

1. A computes $a=k_{A1}+k_{A2}+k_{A3}+k$ (mod q). (If a is 0 or 1, then goes back to step 1.)
2. A computes $\gamma=(\gamma_{A1}{}^1\gamma_{A2}{}^1\gamma_{A3}{}^1)^{k^{-1}}\alpha^k$ (mod p), $f=F(\gamma,(I_{A1}+I_{A2}+I_{A3}))$. Then verifies if $$\alpha^a=(\beta_1\beta_2\beta_3)^f\gamma(\text{mod } p).$$

3. Then a is A's implicitly co-certified private key, $\alpha$ is A's generator, $I_A=I_{A1}+I_{A2}+I_{A3}$ is A's common ID and $(\beta_1\beta_2\beta_3)^f\gamma$ is A's implicitly co-certified public key.
4. A publishes $(\alpha, I_{A1}, I_{A2}, I_{A3}, \beta_1, \beta_2, \beta_3, \gamma, p, q)$ in public domain.
5. Anyone can obtain A's (ID-based) implicitly co-certified public key from the public domain by computing $(\beta_1, \beta_2, \beta_3)^f\gamma(\text{mod } p)$ Applications The following examples are illustrated with respect to scheme 3 (or Scheme 7') as CA's signing equation since everyone shares the same generator in this scheme. Each user can have a different CA as long as the CAs use the same system parameters (p,q,d) and each user has the same generation.

Setup:
CA1: system parameters $(\alpha, \beta_1, p, q, d)$
Alice has a private key a, generator a and publishes $(\alpha, I_A, \beta, \gamma_A, p, q)$ in the public domain.
CA2: system parameters $(\alpha, \beta_2, p, q)$
Bob has a private key b, a generator $\alpha$ and publishes $(\alpha, I_A, \beta, \gamma_A, p, q)$ in the public domain.

We use the MTI/C0 key agreement protocol to demonstrate how to use our new scheme. Assume Alice and Bob want to perform a key exchange. The MTI/C0 protocol 1. Alice reconstructs Bob's public key $\alpha^b=\beta^{F(\gamma_B, I_B)}\gamma_B$, and randomly chooses an integer x and computes $(\alpha^b)^x$, then sends it to Bob.
2. Bob reconstructs Alice's public key $\alpha^a=\beta^{F(\gamma_A, I_A)}\gamma_A$, and randomly chooses an integer y and computes $((\alpha^a)^y$, then sends it to Alice.
3. Alice computes the shared key $K_A=(\alpha^{ay})^{xa^{-1}}=\alpha^{xy}$
4. Bob computes the shared key $K_B=(\alpha^{bx})^{yb^{-1}}=\alpha^{xy}$ This is a two-pass protocol. With the implicit certificate scheme of the present invention, each party only does three exponentiation operations to get the shared key while at the same time performing an authentication key agreement and implicit public key verification.

The following are examples of signcryption schemes. We use scheme 3 (or scheme 7) as CA's signing equation since everyone shares the same generator in this scheme. For the scheme thereafter, we use scheme 13 as CA's signing equation. For all schemes in this section, each user can have a different CA as long as the CA's use the same system parameters (p, q, $\alpha$) and each user has the same generator.

Setup:
CA1: system parameters $(\alpha, \beta_1, p, q)$
Alice: private key a, generator $\alpha$ and $(\alpha, I_A, \beta_1, \gamma_A, p, q)$ in public domain.
CA2: system parameters $(\alpha, \beta_2, p, q)$
Bob: private key b, generator $\alpha$ and $(\alpha, I_B, \beta_2, \gamma_B, p, q)$ in public domain Bob wants to send a signed and encrypted message M to Alice:

Signcryption Protocol 1:
Assume Bob wants to send a signed and encrypted message M to Alice:
Bob does following:
1. reconstructs Alice's public key $\alpha^a=\beta^{F(\gamma_A, I_A)}\gamma_A$ mod p
2. randomly chooses an integer x and computes a key $r=(\alpha^a)^x$ (mod p)
3. computes $C=DES_r(M)$
4. computes $e=\text{hash}(C\ I_A)$
5. computes $s=be+x(\text{mod } q)$
6. sends the pair (C,s) to Alice, thus C is the encrypted message and s is the signature.

To recover the message Alice does following:
1. computes $e=\text{hash}(C\ I_A)$
2. reconstructs Bob's public key $\alpha^b=\beta^{F(\gamma_B, I_B)}\gamma_B$ mod p
3. computes $\alpha^{as}(\alpha^b)^{-ac}(\text{mod } p)$ which is r
4. decrypts the message $M=DES_r(C)$
5. check for redundancy Thus, Bob only does two exponentiation operations and Alice does three exponentiation operations. But Alice and Bob are both confident of each others authentication. Note that for this scheme, the message M must have some redundancy or pattern.

Signcryption Protocol 2 (General Case):
Setup:
CA1: system parameters $(\alpha, \beta_1, p, q)$
Alice: private key a, generator $\alpha$ and $(\alpha, I_A, \beta_1, \gamma_A, p, q)$ in public domain.
CA2: system parameters $(\alpha, \beta_2, p, q)$
Bob: private key b, generator $\alpha$ and $(\alpha, I_B, \beta_2, \gamma_B, p, q)$ in public domain Note: this set tip is for implicit certificate. For usual certificate scheme systems, we only required that Alice and Bob has same generator.

To signcrypt a message to Alice, Bob does following:
1. gets Alice's public key $\alpha^a$ (in the case of implicit certificate scheme, reconstructs Alice's public key $\alpha^a=\beta_1^{F(\gamma_A,\beta,I_A)}\gamma_A(\text{mod } p))$
2. random choose an integer x and computes $r=(\alpha^a)^x(\text{mod } p)$
3. computes $C=DES_r(M)$
4. computes $e=\text{hash}(C\|\alpha^a)$
5. computes $s=be+x$ (mod q)
6. sends (C,s) to Alice. C is the encrypted message and s is the signature.

To recover the message Alice does following:
1. computes e=hash(C||$\alpha^a$)
2. gets Bob's public key $\alpha^b$ (in the case of implicit certificate scheme, reconstructs Bob's public key $\alpha^b=\beta_2^{F(\gamma_B,\beta_1,I_B)}\gamma_B$ (mod p))
3. computes $\alpha^{as}(\alpha^b)^{ac}$ (mod p) which is r
4. decrypts the message M=DES$_r$(C)

Note:
1. If the certificate scheme is not the implicit certificate as described herein, Alice and Bob's public key should be verified.
2. The message M must have some redundancy or pattern.
3. Anyone who knows one value r can decrypt any messages from Bob to Alice since the value $\alpha^{ab}$ will be exposed.
4. In general, we should include an option parameter to the hash e, i.e. e=hash(C||$\alpha^a$||OP). For example, OP=$\alpha^b$ or OP=$\alpha^b$||$\beta_1$||$\beta_2$.

The signcryption schemes above have a drawback that if the signer lost his/her private signing key, then all message the signer signcrypted will be exposed to public. To protect post encryption we propose a new signcryption scheme. In new scheme, each user has two pairs of key, one pair is for signature key, another pair is encryption key. The new scheme can be used with any certificate scheme. But if it is used with our implicit certificate scheme it is more efficient.

Signcryption Protocol 3 (General Case):

Setup:
Alice: private signing key a and private encryption key $a_E$, generator $\alpha$ and ($\alpha$, $\alpha^{a_E}$, $I_A$, $\beta_1$, $\gamma_A$, p, q) in public domain.
CA2: System Parameters ($\alpha$, $\beta_2$, p, q)
Bob: private signing key b and private encryption key $b_E$, generator $\alpha$ and ($\alpha$, $\alpha^{b_E}$, $I_B$, $\beta_2$, $\gamma_B$, p, q) in public domain
Note: this set up is for implicit certificate using scheme 6.c. For usual certificate scheme systems, we only required that Alice and Bob has same generator.

To signcrypt a message to Alice, Bob does following:
1 gets Alice's public signing key $\alpha^a$ and public encryption key $\alpha^{a_E}$ (in the case of implicit certificate scheme, reconstructs Alice's public signing key $\alpha^a=\beta_1^{F(\gamma_A,\beta_1,I_A,\alpha^{a_E})}\gamma_A$ (mod p))
2 random choose an integer x and computes r=($\alpha^a\alpha^{a_E}$)$^x$ (mod p)
3 computes C=DES$_r$(M)
4 computes e=hash(C||$\alpha^a$||$\alpha^{a_E}$||$\alpha^b$||$\alpha^{b_E}$||OP.)
5 computes s=be+x+$b_E$ (mod q)
6 sends (C,s) to Alice. C is the encrypted message and s is the signature.

To recover the message Alice does following:
1. computes e=hash(C||$\alpha^a$||$\alpha^{a_E}$||$\alpha^b$||$\alpha^{b_E}$||OP)
2. gets Bob's public signing key $\alpha^b$ and public encryption key $\alpha^{b_E}$ (in the case of implicit certificate scheme, reconstructs Bob's public sign key $\alpha^b=\beta_2^{F(\gamma_B,\beta_1,I_s,\alpha^b_E)}\gamma_B$ (mod p))
3. computes $\alpha^{(a+a_E)s}(\alpha^b)^{-(a+a_E)e}\alpha^{-(a+a_E)b_E}$ (mod p) which is r
4. decrypts the message M=DES$_r$(C)

Note:
1. we can think the receiver Alice's private key is a+$a_E$, This means the receiver only needs one private key instead of two private keys. But the sender Bob needs two private keys. In case of normal certificate, the receiver only need one private key.
2. If the certificate scheme is not the implicit certificate described in this application, Alice and Bob's public key should be verified.
3. The message M must have some redundant or pattern.
4. The parameter OP inside hash e=hash (C||$\alpha^a$||$\alpha^{a_E}$||$\alpha^b$||$\alpha^{b_E}$||OP) may be empty or OP=$\beta_1$||$\beta_2$.
5. Knowing one r value does not reveal any information of the post messages.
6. With implicit certificate scheme, Bob only does 2 exponentiation operations and Alice does 4 exponentiation operations. But Alice and Bob both are confidential that each other is authentication part.
7. If anyone knows Alice's private key a+$a_E$, or Bob lost both private keys, the post encrypted message can not be protected.

For normal signatures, one problem is that the signer denies he/she signs the signature. This called repudiation. Protocol 1 and 2 above have a non-repudiation feature provided one trusts the judge. That is the signer can not deny that he/she signed the signcrypted message. Protocol 3 has a non-repudiation feature even when the judge is not trusted. Next protocol demonstrates how a judge decides a case where Bob wants to deny the signature.

Non-repudiation Protocol:
1. Alice sends (C,s) to Judge
2. Judge computes e=hash(C||$\alpha^a$||$\alpha^{a_E}$||$\alpha^b$||$\alpha^{b_E}$||OP) and $\alpha^x=\alpha^s(\alpha^b)^{-e}\alpha^{-b_E}$ (Note: Alice and Bob's two pairs of public key should be verified. In the case of implicit certificate scheme, the public keys should be computed from the reconstruction public data.)
3. Judge randomly chooses two integer $r_1$ and $r_2$ and computes L=($\alpha^x$)$^{r_1}\alpha^{r_2}$ and sends L to Alice
4. Alice computes L$^{a+a_E}$ and sends it back to Judge
5. Judge computes r=(L$^{(a+a_E)}(\alpha^a\alpha^{a_E})^{-r_2})^{r_1-1}$ and recover the message by M=DES$_r$(C)
6. If M has proper format, the (C,s) must be signcrypted by Bob.
7. After the judge make decision, lie sends the values ($\alpha^x$, $r_1$, $r_2$, L, L$^{a+a_E}$, r) to Alice and Bob to back up his decision.

For the other two signcryption protocols the non-repudiation protocols are similar provided one fully trust the judge.

In conclusion it may be seen that the present scheme, when combined with an application protocol for which the user's private key must be used directly in computation, provides an implicitly certified ID-based public key of the user. These schemes can also be used for a Key Authentication Center (KAC) to distribute implicitly certified public keys to users.

A further application of implicitly certified public keys is that the bit strength of the certifying authority is the same as the user or entity public keys being certified. By bit strength it is implied the relative key sizes and processing power of the entities concerned.

One approach to addressing this issue is to embed implicitly certified public keys into more traditional certificate structures such as specified in X.509 certificates, where the signature on the certificate is at a higher bit strength than the implicitly certified public key. Hence, the CA has certified the user public key at two different security levels. Any other entity retrieving a public key call decide on which security level they wish to accept. In some applications it may be that only the lower level provided by the implicit value is necessary to provide the performance required.

While the invention has been described in connection with specific embodiments thereof and in specific uses, various modifications thereof will occur to those skilled in the art without departing from the spirit of the invention as set forth in the appended claims. For example in the above description of preferred embodiments, use is made of multiplicative notation, however the method of the subject invention may be equally well described utilizing additive notation. It is well known for example that elliptic curve algorithm embodied in the ECDSA is equivalent of the DSA and that the elliptic curve analog of a discrete log logorithm algorithm that is usually described in a setting of, $F_p^*$ the multiplicative group of the integers modulo a prime. There is a correspondence between the elements and operations of the group $F_p^*$ and the elliptic curve group $E(F_q)$. Furthermore, this signature technique is equally well applicable to functions performed in a field defined over $F_p$ and $F^{2^R}$. It is also to be noted that the DSA signature scheme described above is a specific instance of the ElGamal generalized signature scheme which is known in the art and thus the present techniques are applicable thereto.

The embodiments of the invention in which an exclusive property or privilege is claimed are defined as follows:

1. A method of generating a public key in a secure digital communication system, having at least one trusted entity CA and subscriber entities A, said method comprising the steps of:

a) for each entity A, said CA selecting a unique identity $I_A$ distinguishing said entity A;

b) said CA generating a public key reconstruction public data $\gamma_A$ of an entity A by mathematically combining public values obtained from respective private values of said trusted party CA and said entity A, to obtain a pair ($I_A$, $\gamma_A$) serving as A's implicit certificate;

c) combining said implicit certificate information ($I_A$, $\gamma_A$) in accordance with a mathematical function $F(I_A, \gamma_A)$ to derive an entity information $f$;

d) generating a value $k_A$ by binding said entity information $f$ with private values of said CA and transmitting said value $k_A$ to said entity A to permit A to generate a private key from said value $k_A$, the private value of said entity A, and said implicit certificate.

whereby said entity A's public key may be reconstructed from public information, said public key reconstruction public data $\gamma_A$ and said identity $_A$.

2. A method according to claim 1, wherein said mathematical function F is a secure hash function.

3. A method according to claim 1, wherein said private value of said entity A is made available at said entity A and the corresponding public value obtained therefrom is made available at said trusted entity.

4. A method according to claim 1, wherein the mathematical combination in step (b) is a multiplication.

5. A method according to claim 1, wherein the private values of said trusted entity include a private key and an integer.

6. A method according to claim 5, wherein one of the public values used in step (b) corresponds to said private key of said trusted entity.

7. A method according to claim 5, wherein said value $k_A$ is computed by multiplying said entity information $f$ by said integer and adding said private key of said trusted entity thereto.

8. A method according to claim 6, wherein said value $k_A$ is computed by multiplying said entity information $f$ by said integer and adding said private key of said trusted entity thereto.

* * * * *